United States Patent
Suzuki

(10) Patent No.: US 12,551,317 B2
(45) Date of Patent: Feb. 17, 2026

(54) DENTAL HANDPIECE

(71) Applicant: Kazuyoshi Suzuki, Chiba (JP)

(72) Inventor: Kazuyoshi Suzuki, Chiba (JP)

(73) Assignee: Kazuyoshi Suzuki, Chiba (JP)

(*) Notice: Subject to any disclaimer, the term of this patent is extended or adjusted under 35 U.S.C. 154(b) by 373 days.

(21) Appl. No.: 18/017,907

(22) PCT Filed: Mar. 30, 2022

(86) PCT No.: PCT/JP2022/016275
§ 371 (c)(1),
(2) Date: Jan. 25, 2023

(87) PCT Pub. No.: WO2023/021783
PCT Pub. Date: Feb. 23, 2023

(65) Prior Publication Data
US 2024/0065804 A1    Feb. 29, 2024

(30) Foreign Application Priority Data
Aug. 18, 2021  (JP) .................. 2021-152626

(51) Int. Cl.
*A61C 1/12*   (2006.01)
*A61C 1/07*   (2006.01)
(Continued)

(52) U.S. Cl.
CPC .................. *A61C 1/12* (2013.01); *A61C 1/07* (2013.01); *A61C 5/40* (2017.02); *A61C 3/03* (2013.01)

(58) Field of Classification Search
CPC .. A61C 1/06; A61C 1/07; A61C 1/148; A61C 1/185; A61C 5/40; A61C 5/42;
(Continued)

(56) References Cited

U.S. PATENT DOCUMENTS

| | | |
|---|---|---|
| 4,834,653 A | 5/1989 | Edwardson |
| 5,145,369 A | 9/1992 | Lustig et al. |

(Continued)

FOREIGN PATENT DOCUMENTS

| | | | |
|---|---|---|---|
| CN | 107981939 | * | 5/2018 |
| EP | 0550441 A4 | | 5/1993 |

(Continued)

OTHER PUBLICATIONS

Machine Translation of JP2020081828. Accessed via Google Patents on Jul. 2, 25 (Year: 2020).*

(Continued)

*Primary Examiner* — Edward Moran
(74) *Attorney, Agent, or Firm* — Carrier, Shende & Associates P.C.; Joseph P. Carrier; Jeffrey T. Gedeon

(57) ABSTRACT

A wall portion of a dental handpiece accommodates a cam pin 111 with a cam hole 21 or a cam groove 211 designed so that the size of the cam hole 21 or the cam groove 211 is larger than the size of the cam pin 111 in each of the axial direction and the circumferential direction of a vibration cylinder 20. Therefore, a rotating member 110 is rotationally driven, and a vibrating force acts on the vibration cylinder 20 in the axial direction through the cam pin 111. In this manner, the vibration cylinder 20 vibrates or reciprocates in the axial direction with respect to a second cylindrical member 12, and vibrates or reciprocates in the circumferential direction. In addition, a needle portion 42 protruding from a through-hole 202 of the vibration cylinder 20 vibrates while being bent.

6 Claims, 4 Drawing Sheets

(51) Int. Cl.
*A61C 3/03* (2006.01)
*A61C 5/40* (2017.01)

(58) Field of Classification Search
CPC ........... A61C 5/46; A61C 17/18; A61C 17/20; A61C 3/03; A61C 1/12
See application file for complete search history.

(56) References Cited

U.S. PATENT DOCUMENTS

| | | |
|---|---|---|
| 6,629,842 B2 * | 10/2003 | Satake ................... A61C 1/185 433/105 |
| 6,899,715 B1 | 5/2005 | Beaty |
| 8,579,629 B2 | 11/2013 | Nakanishi |
| 10,350,028 B2 | 7/2019 | Shotton et al. |
| 2002/0025504 A1 | 2/2002 | Satake et al. |

FOREIGN PATENT DOCUMENTS

| | | |
|---|---|---|
| JP | S63-79911 U | 5/1988 |
| JP | H01-313050 A | 12/1989 |
| JP | 2012-249766 A | 12/2012 |
| JP | 2013-099444 A | 5/2013 |
| JP | 2019-193761 A | 11/2019 |
| JP | 2020-081828 A | 6/2020 |
| JP | 2020-131010 A | 8/2020 |
| JP | 2021-090718 A | 6/2021 |
| KR | 102223344 * | 3/2021 |

OTHER PUBLICATIONS

Office Action dated Nov. 7, 2025 issued in the corresponding Indian Patent Application No. 202447009230.

* cited by examiner

DENTAL HANDPIECE

TECHNICAL FIELD

The present invention relates to a dental handpiece for driving a dental piece such as a file and/or a reamer attached to a tip portion in order to treat a root canal of a tooth.

BACKGROUND ART

As a dental piece, a file and/or a reamer are generally used when performing a root canal treatment, such as scraping a wall surface of a root of a decayed tooth of a patient, removing a lump of pus and/or a filler clogged at a tip of the root, and/or removing nerves. For example, gutta-percha (root canal filler) is generally removed by using the file.

SUMMARY OF INVENTION

Technical Problem

However, when the purpose of treatment is to scrape off the wall surface of the root canal of the patient's tooth, it is desirable that not only the reamer or the like is reciprocated in the axial direction, but also the wall portion of the root canal is efficiently scraped by the needle portion.

Therefore, an object of the present invention is to provide a wall portion dental handpiece capable of improving efficiency in cutting a root canal of a tooth by using a dental piece such as a reamer.

Solution to Problem

According to the present invention, there is provided a dental handpiece including a first cylindrical member, a second cylindrical member in which a communication hole continuous with an internal space of the first cylindrical member is formed on a side wall, and connected to one end portion of the first cylindrical member on the side wall, a vibration cylinder supporting a needle substrate in a state where a needle portion of a dental piece having the needle substrate and the needle portion extending from the needle substrate is protruded to an external space, and inserted into the second cylindrical member in a coaxial posture, a rotating member disposed in the internal space of the first cylindrical member so that one end portion is directed to an internal space of the second cylindrical member via the communication hole, and an actuator that drives the rotating member to rotate around a central axis.

In the dental handpiece of the present invention, a cam protruding portion protruding at a position eccentric with respect to the central axis of the rotating member is provided in the one end portion of the rotating member. A cam recessed portion into which the cam protruding portion is fitted is formed on an outside of the side wall of the vibration cylinder. The cam recessed portion is formed so that the cam protruding portion of the rotating member is relatively displaceable in a circumferential direction of the vibration cylinder.

In the dental handpiece having the above-described configuration, it is preferable that the cam recessed portion is formed in an annular cam groove extending over an entire circumference on the outside of the side wall of the vibration cylinder, or a cam groove continuously extending in a portion in the circumferential direction on the outside of the side wall of the vibration cylinder.

In the dental handpiece having the above-described configuration, it is preferable that the cam recessed portion is formed on the outside of the side wall of the vibration cylinder so that a width of the cam recessed portion in an axial direction of the vibration cylinder is changed in the circumferential direction of the vibration cylinder.

In the dental handpiece having the above-described configuration, it is preferable that at least one side surface of a pair of side surfaces of the cam recessed portion which face the axial direction of the vibration cylinder is formed as a waveform surface.

In the dental handpiece having the above-described configuration, it is preferable that at least one side surface of a pair of side surfaces of the cam recessed portion which face the axial direction of the vibration cylinder is formed as a gear surface having a plurality of teeth, and at least a portion of a side surface of the cam protruding portion is formed as a gear wheel surface having a plurality of teeth meshing with the gear surface.

In the dental handpiece having the above-described configuration, it is preferable that in the one end portion of the rotating member, a plurality of mounting holes for mounting the cam protruding portion are formed at locations where eccentricity with reference to the central axis of the rotating member is different.

In the dental handpiece having the above-described configuration, it is preferable that a sliding layer is formed in at least one of a surface of the cam protruding portion and a surface of the cam recessed portion.

DESCRIPTION OF EMBODIMENTS

First Embodiment

Figure 1:
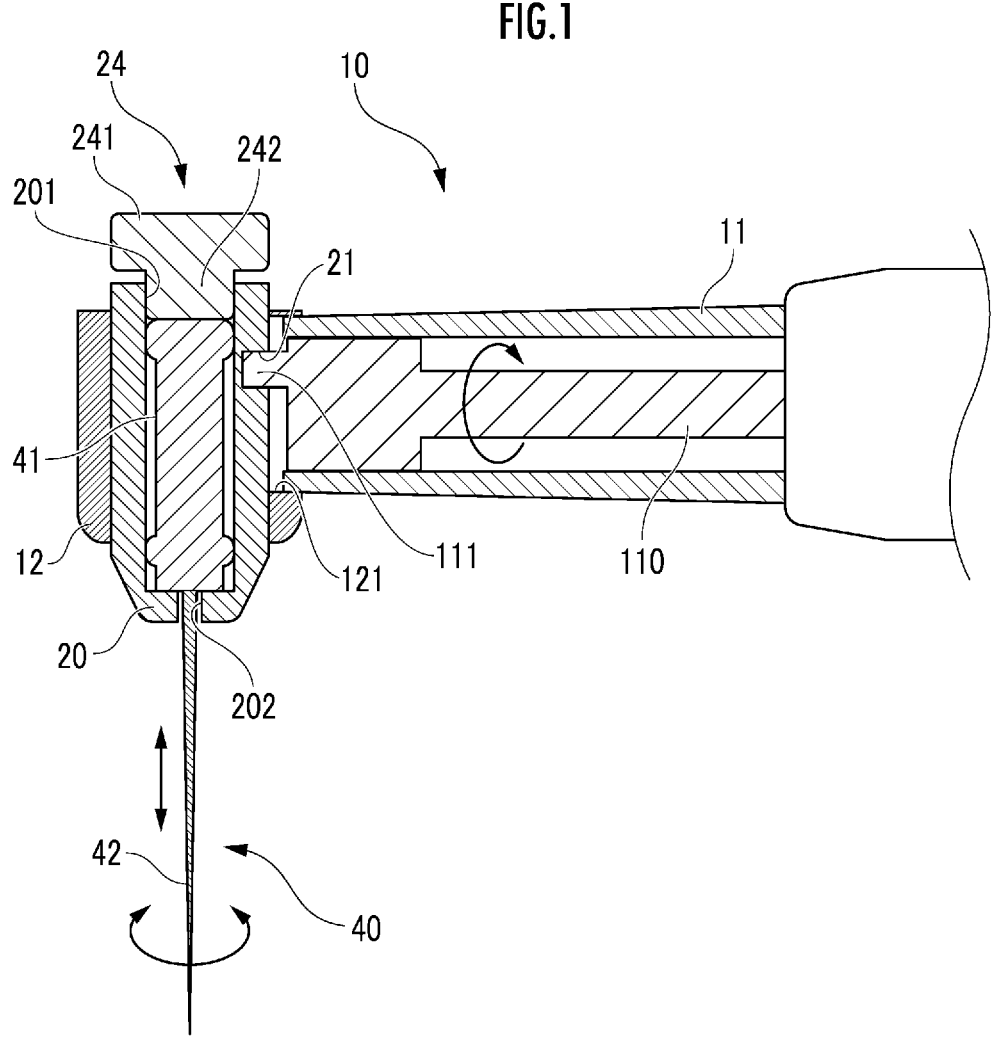
FIG. 1 is a configuration diagram illustrating a dental handpiece as a first embodiment of the present invention.

A dental handpiece 10 as a first embodiment of the present invention schematically illustrated in FIG. 1 is configured to drive a reamer 40 (or a file) as a dental piece. The dental handpiece 10 includes a first cylindrical member 11, a second cylindrical member 12 (support cylinder), and a vibration cylinder 20. The first cylindrical member 11 is formed in a substantially cylindrical shape. The second cylindrical member 12 is formed in a substantially cylindrical shape, and the vibration cylinder 20 is connected to a side wall of a tip portion of the first cylindrical member 11 in a posture in which a central axis of the second cylindrical member 12 forms a constant angle (for example, an angle range of 90° to 120°) or intersects with a central axis of the first cylindrical member 11. The vibration cylinder 20 is inserted into an internal space of the second cylindrical member 12 to be capable of vibrating in a posture substantially coaxial with the second cylindrical member 12 and in a direction parallel to the central axis of the second cylindrical member 12 (upward-downward direction in FIGS. 1 and 2).

The first cylindrical member 11, the second cylindrical member 12, and the vibration cylinder 20 are formed of metal such as an aluminum alloy and stainless steel. The first cylindrical member 11 and the second cylindrical member 12 are integrally formed of the same metal. The vibration cylinder 20 may be formed of the metal the same as that of the first cylindrical member 11 and the second cylindrical member 12, or may be formed of different metal.

Figure 2:
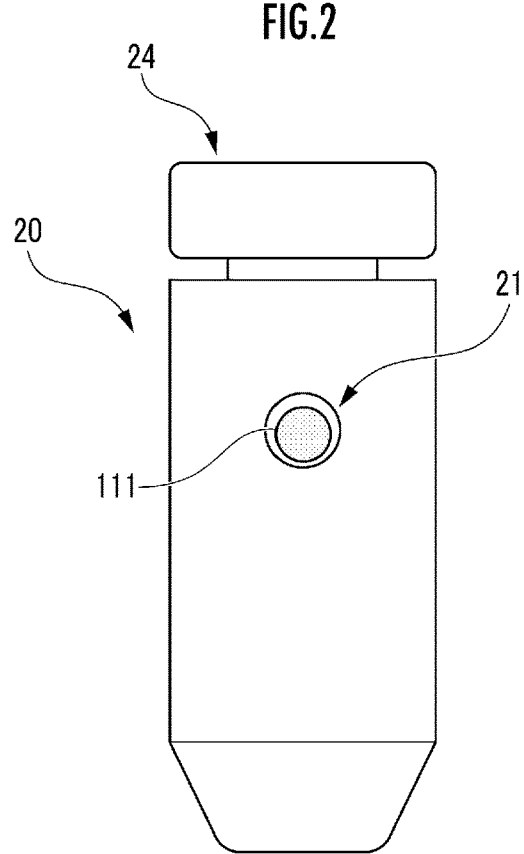
FIG. 2 is a configuration diagram illustrating a main portion of the dental handpiece in FIG. 1.

As illustrated in FIG. 1, a substantially cylindrical rotating member 110 is disposed in the internal space of the first cylindrical member 11 in a posture in which the central axis of the rotating member 110 extends parallel to or substantially parallel to a longitudinal direction of the first cylindrical member 11. A tip portion of the rotating member 110 is formed in a substantially cylindrical shape having a relatively large diameter. As illustrated in FIGS. 1 and 2, the tip portion is provided with a cam pin 111 (cam protruding portion) eccentric with respect to the central axis of the rotating member 110 and protruding in a direction parallel to the central axis. A pin mounting hole extending parallel to the central axis may be formed in the tip portion of the rotating member 110, and the cam pin 111 may be detachably mounted on the pin mounting hole. The rotating member 110 is connected to a rotary shaft of an electric motor of a chair unit, and is configured to be driven to rotate around the central axis. For example, a switch for controlling an operation of the electric motor to be turned on/off is configured to include a foot-operated foot switch (not illustrated).

As illustrated in FIG. 1, the internal space of the first cylindrical member 11 and the internal space of the second cylindrical member 12 communicate with each other through a communication hole 121 formed on a side wall of the second cylindrical member 12.

As illustrated in FIG. 1, a cam hole 21 (cam recessed portion) locally recessed in a radial direction is formed on an outside of the side wall of the vibration cylinder 20. The cam pin 111 of the rotating member 110 is fitted into the cam hole 21 of the vibration cylinder 20. For example, as schematically illustrated in FIG. 2, the cam hole 21 is formed in a substantially circular shape having a diameter larger than a diameter of the cam pin 111 having a substantially columnar shape so that a clearance is formed between the cam pin 111 and the cam hole 21 in a circumferential direction and an axial direction of the vibration cylinder 20.

Each shape of the cam pin 111 and the cam hole 21 may be designed in various forms. For example, the cam hole 21 may be formed in a substantially elliptical shape in which each of a minor diameter and a major diameter is larger than a diameter of the cam pin 111 having a substantially columnar shape. A major axial direction of the cam hole 21 having the elliptical shape may be parallel to the axial direction of the vibration cylinder 20, or may be designed to form a constant angle such as 30° or 90°. The cam hole 21 may be formed in a substantially circular shape having a diameter larger than the major diameter of the cam pin 111 having a substantially elliptical columnar shape. The major axial direction of the cam pin 111 having the elliptical shape may be parallel to the axial direction of the vibration cylinder 20, or may be designed to form a constant angle such as 30° or 90°.

A sliding layer for improving slidability (reducing frictional force) may be formed on at least an outer surface of the cam pin 111 of the rotating member 110 and at least a side surface (or a side surface and a bottom surface) of the cam hole 21 of the vibration cylinder 20. The sliding layer may be configured to include a carbon coating layer formed of a diamond-like carbon (DLC).

As illustrated in FIG. 1, the internal space of the vibration cylinder 20 communicates with an external space through a mounting port 201 on one end side, and communicates with an external space through a through-hole 202 having a diameter smaller than that of the mounting port 201 on the other end side. One end side of the internal space of the vibration cylinder 20 is closed by mounting the lid member 24 on the mounting port 201. As illustrated in FIG. 2, the lid member 24 is configured to include a substantially disk-shaped head portion 241 and a substantially cylindrical mounting portion 242 protruding from one end of the head portion 241. A female screw is formed inside the side wall in the mounting port 201 of the vibration cylinder 20, and a male screw screwed into the female screw is formed on a side surface of the mounting portion 242 of the lid member 24. The female screw of the vibration cylinder 20 and the male screw of the lid member 24 may be omitted, and the mounting portion 242 of the lid member 24 may be fitted to the vibration cylinder 20 by being brought into pressurizing contact with the inside of the side wall of the vibration cylinder 20. The lid member 24 is formed of metal such as an aluminum alloy and stainless steel.

As illustrated in FIG. 1, the reamer 40 includes a needle substrate 41 and a needle portion 42. The needle portion 42 is fixed to the needle substrate 41 to protrude in the axial direction from one end side of the substantially cylindrical needle substrate 41. The needle portion 42 is formed so that the diameter gradually decreases from a base end portion to a tip portion. The reamer 40 is mounted on the vibration cylinder 20 in a state where the needle substrate 41 is accommodated in the internal space of the vibration cylinder 20 and the needle portion 42 partially protrudes from the through-hole 202. The needle substrate 41 comes into contact with a stepped portion of the through-hole 202 on one end side, and comes into contact with an end portion of the mounting portion 242 of the lid member 24 on the other end side. In this manner, the needle substrate 41 and the reamer 40 are fixed to the vibration cylinder 20. The needle portion 42 may be flexible or bendable.

In the present embodiment, a support mechanism that supports the reamer 40 (dental piece) to be capable of vibrating is configured to include the second cylindrical member 12, the vibration cylinder 20, and the lid member 24.

(Function)

The cam pin 111 and the cam hole 21 are designed so that the size of the cam hole 21 is larger than the size of the cam pin 111 in each of the axial direction and the circumferential direction of the vibration cylinder 20 (refer to FIG. 2). Therefore, the rotating member 110 is rotationally driven, and a vibrating force acts on the vibration cylinder 20 in the axial direction through the cam pin 111. In this manner, the vibration cylinder 20 vibrates or reciprocates in the axial direction with respect to the second cylindrical member 12, and vibrates or reciprocates in the circumferential direction. In addition, the needle portion 42 protruding from the through-hole 202 of the vibration cylinder 20 vibrates while being bent. Therefore, an operator can perform a root canal treatment by bringing the vibrating needle portion 42 into contact with a wall portion of a root canal of a tooth of a patient.

For example, the cam pin 111 and the cam hole 21 are designed so that an amplitude of the reamer 40 has any desired value in a range of 0.4 mm to 2.0 mm in the axial direction of the second cylindrical member 12. In this manner, it becomes easier to feed the needle portion 42 to a root apex of the root canal.

Second Embodiment

Figure 3:
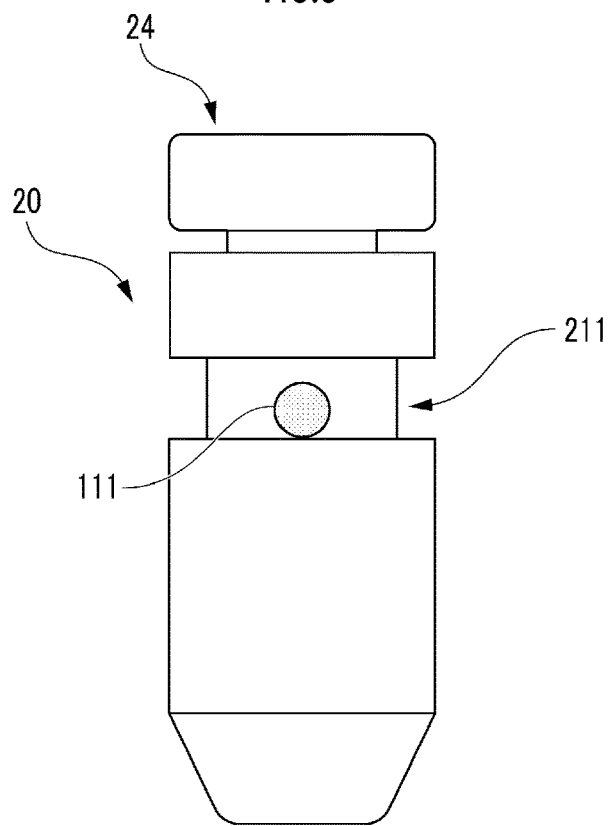
FIG. 3 is a configuration diagram illustrating a main portion of a dental handpiece as a second embodiment of the present invention.

In the dental handpiece 10 as a second embodiment of the present invention, as schematically illustrated in FIG. 3, instead of the pin hole of the first embodiment (refer to the reference numeral 21 in FIG. 1), a substantially annular cam groove 211 extending over the entire circumference in the circumferential direction is formed on the outside of the side wall of the vibration cylinder 20. The cam pin 111 of the rotating member 110 is fitted into the cam groove 211 of the vibration cylinder 20. The cam groove 211 may be formed outside the side wall of the vibration cylinder 20 in an annular shape extending in the circumferential direction over a partial range (for example, 0° to 350°) of an azimuth angle range of 0° to 360° with reference to the central axis of the vibration cylinder 20 while being intermittent at one location.

The dental handpiece 10 as the second embodiment of the present invention has a configuration substantially the same as that of the dental handpiece 10 (refer to FIGS. 1 and 2) as the first embodiment of the present invention except for the configuration. Common reference numerals will be assigned to common configurations, and description thereof will be omitted.
(Function)

The cam pin 111 and the cam groove 211 are designed so that the size of the cam groove 211 is larger than the size of the cam pin 111 in each of the axial direction and the circumferential direction of the vibration cylinder 20 (refer to FIG. 3). Therefore, the rotating member 110 is rotationally driven, and a vibrating force acts on the vibration cylinder 20 in the axial direction through the cam pin 111. In this manner, the vibration cylinder 20 vibrates or reciprocates in the axial direction with respect to the second cylindrical member 12, and vibrates or reciprocates in the circumferential direction. In addition, the needle portion 42 protruding from the through-hole 202 of the vibration cylinder 20 vibrates while being bent. Therefore, an operator can perform a root canal treatment by bringing the vibrating needle portion 42 into contact with a root canal of a tooth of a patient.

Third Embodiment

Figure 4:
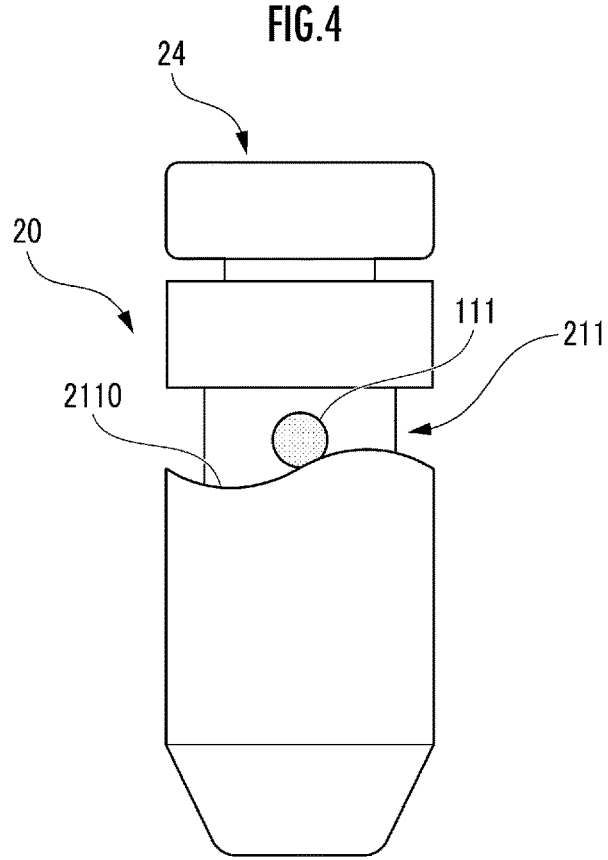
FIG. 4 is a configuration diagram illustrating a main portion of a dental handpiece as a third embodiment of the present invention.

In the dental handpiece 10 as a third embodiment of the present invention, as in the second embodiment, as schematically illustrated in FIG. 4, the substantially annular cam groove 211 extending over the entire circumference in the circumferential direction is formed on the outside of the side wall of the vibration cylinder 20. The cam pin 111 of the rotating member 110 is fitted into the cam groove 211 of the vibration cylinder 20. At least one side surface (lower side surface in FIG. 4) of the pair of side surfaces defining the cam groove 211 in the axial direction of the vibration cylinder 20 is formed as a waveform surface 2110. An amplitude and a period of the waveform surface 2110 are designed so that the cam pin 111 is relatively displaceable along the cam groove 211 in the circumferential direction of the vibration cylinder 20.

The dental handpiece 10 as the third embodiment of the present invention has a configuration substantially the same as that of the dental handpiece 10 (refer to FIGS. 1 and 2) as the first embodiment of the present invention except for the configuration. Common reference numerals will be assigned to common configurations, and description thereof will be omitted.
(Function)

The cam pin 111 and the cam hole 21 or the cam groove 211 are designed so that the size of the cam hole 21 or the cam groove 211 is larger than the size of the cam pin 111 in each of the axial direction and the circumferential direction of the vibration cylinder 20. Therefore, the rotating member 110 is rotationally driven, and a vibrating force acts on the vibration cylinder 20 in the axial direction through the cam pin 111. In this manner, the vibration cylinder 20 vibrates or reciprocates in the axial direction with respect to the second cylindrical member 12, and vibrates or reciprocates in the circumferential direction. In addition, the needle portion 42 protruding from the through-hole 202 of the vibration cylinder 20 vibrates while being bent. Therefore, an operator can perform a root canal treatment by bringing the vibrating needle portion 42 into contact with a root canal of a tooth of a patient.

In this case, various portions including a peak portion and a valley portion of the waveform surface 2110 of the cam pin 111 and the cam groove 211 are brought into contact. Accordingly, the amplitude of the vibration cylinder 20 and the needle portion 42 of the reamer 40 in the axial direction can be irregular. In this manner, the needle portion 42 of the reamer 40 has a width in a mode of rubbing the wall portion of the root canal of the tooth, and thus, the wall portion can be efficiently scraped.

Fourth Embodiment

Figure 5:
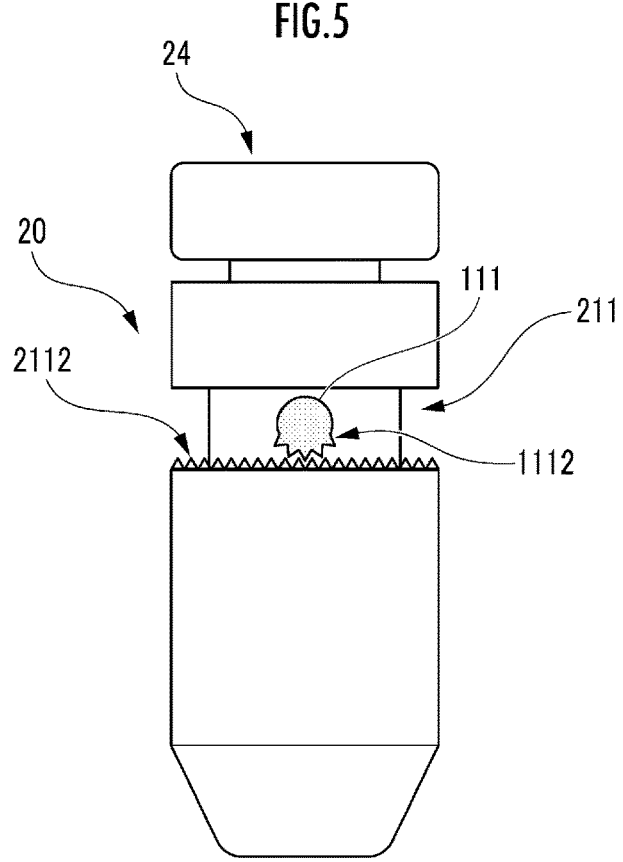
FIG. 5 is a configuration diagram illustrating a main portion of a dental handpiece as a fourth embodiment of the present invention.

In the dental handpiece 10 as a fourth embodiment of the present invention, as in the second embodiment, as schematically illustrated in FIG. 5, the substantially annular cam groove 211 extending over the entire circumference in the circumferential direction is formed on the outside of the side wall of the vibration cylinder 20. The cam pin 111 of the rotating member 110 is fitted into the cam groove 211 of the vibration cylinder 20. At least one side surface (lower side surface in FIG. 4) of the pair of side surfaces defining the cam groove 211 in the axial direction of the vibration cylinder 20 is formed as a gear surface 2112. A portion of the side wall of the cam pin 111 is formed as a gear wheel surface 1112 that meshes with the gear surface 2112. A tooth height and a tooth pitch of the gear surface 2112 and the gear wheel surface 1112 are designed so that the cam pin 111 is relatively displaceable in the circumferential direction of the vibration cylinder 20 along the cam groove 211.

The dental handpiece 10 as the fourth embodiment of the present invention has a configuration substantially the same as that of the dental handpiece 10 (refer to FIGS. 1 and 2) as the first embodiment of the present invention except for the configuration. Common reference numerals will be assigned to common configurations, and description thereof will be omitted.
(Function)

The cam pin 111 and the cam hole 21 or the cam groove 211 are designed so that the size of the cam hole 21 or the cam groove 211 is larger than the size of the cam pin 111 in each of the axial direction and the circumferential direction of the vibration cylinder 20. Therefore, the rotating member 110 is rotationally driven, and a vibrating force acts on the vibration cylinder 20 in the axial direction through the cam pin 111. In this manner, the vibration cylinder 20 vibrates or reciprocates in the axial direction with respect to the second cylindrical member 12, and vibrates or reciprocates in the circumferential direction. In addition, the needle portion 42 protruding from the through-hole 202 of the vibration cylinder 20 vibrates while being bent. Therefore, an operator can perform a root canal treatment by bringing the vibrating needle portion 42 into contact with a root canal of a tooth of a patient.

In this case, the gear wheel surface 1112 of the cam pin 111 and the gear surface 2112 of the cam groove 211 are brought into contact in various modes. Accordingly, the amplitude of the vibration cylinder 20 and the needle portion 42 of the reamer 40 in the axial direction can be irregular. In this manner, the needle portion 42 of the reamer 40 has a width in a mode of rubbing the wall portion of the root canal of the tooth, and thus, the wall portion can be efficiently scraped.

Other Embodiments of Present Invention

Figure 6:
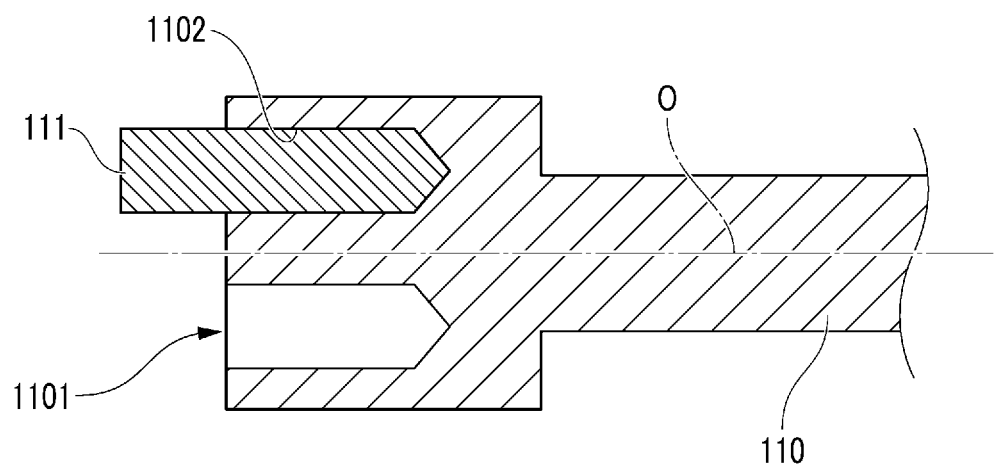
FIG. 6 is a configuration diagram illustrating a main portion of a dental handpiece as another embodiment of the present invention.

As schematically illustrated in FIG. 6, a first pin mounting hole 1101 and a second pin mounting hole 1102 which have different eccentricities with reference to the central axis O of the rotating member 110 may be formed in the tip portion of the rotating member 110. In FIG. 6, the eccentricity of the first pin mounting hole 1101 is smaller than the eccentricity of the second pin mounting hole 1102. The cam pin 111 is selectively mounted on and fixed to each of the first pin mounting hole 1101 and the second pin mounting hole 1102.

Advantageous Effect of Invention

The cam pin 111 and the cam hole 21 or the cam groove 211 are designed so that the size of the cam hole 21 or the cam groove 211 is larger than the size of the cam pin 111 in each of the axial direction and the circumferential direction of the vibration cylinder 20. Therefore, the rotating member 110 is rotationally driven, and a vibrating force acts on the vibration cylinder 20 in the axial direction through the cam pin 111. In this manner, the vibration cylinder 20 vibrates or reciprocates in the axial direction with respect to the second cylindrical member 12, and vibrates or reciprocates in the circumferential direction. In addition, the needle portion 42 protruding from the through-hole 202 of the vibration cylinder 20 vibrates while being bent. Therefore, an operator can perform a root canal treatment by bringing the vibrating needle portion 42 into contact with a root canal of a tooth of a patient.

DESCRIPTION OF REFERENCE NUMERALS

10: Dental handpiece
11: First cylindrical member
12: Second cylindrical member (support cylinder)
20: Vibration cylinder
21: Cam hole (cam recessed portion)
22: Guide pin
24: Lid member
40: Reamer (dental piece)
41: Needle substrate
42: Needle portion
100: Anti-reflection layer
110: Rotating member
111: Cam pin (cam protruding portion)
121: Communication hole
122: Guide groove
201: Mounting port
202: Through-hole
211: Cam groove (cam recessed portion)
241: Head portion
242: Mounting portion

The invention claimed is:

1. A dental handpiece comprising:
a first cylindrical member;
a second cylindrical member in which a communication hole continuous with an internal space of the first cylindrical member is formed on a side wall, and connected to one end portion of the first cylindrical member on the side wall;
a vibration cylinder supporting a needle substrate in a state where a needle portion of a dental piece having the needle substrate and the needle portion extending from the needle substrate is protruded to an external space, and inserted into the second cylindrical member in a coaxial posture;
a rotating member disposed in the internal space of the first cylindrical member so that one end portion is directed to an internal space of the second cylindrical member via the communication hole; and
an actuator that drives the rotating member to rotate around a central axis,
wherein a cam protruding portion protruding at a position eccentric with respect to the central axis of the rotating member is provided in the one end portion of the rotating member,
a cam recessed portion into which the cam protruding portion is fitted is formed on an outside of a side wall of the vibration cylinder,
the cam recessed portion is formed so that the cam protruding portion of the rotating member is relatively displaceable in a circumferential direction of the vibration cylinder, and
wherein in the one end portion of the rotating member, a plurality of mounting holes for mounting the cam protruding portion are formed at locations where eccentricity with reference to the central axis of the rotating member is different.

2. The dental handpiece according to claim 1,
wherein the cam recessed portion is formed in an annular cam groove extending over an entire circumference on the outside of the side wall of the vibration cylinder, or a cam groove continuously extending in a portion in the circumferential direction on the outside of the side wall of the vibration cylinder.

3. The dental handpiece according to claim 2,
wherein the cam recessed portion is formed on the outside of the side wall of the vibration cylinder so that a width of the cam recessed portion in an axial direction of the vibration cylinder is changed in the circumferential direction of the vibration cylinder.

4. The dental handpiece according to claim 3,
wherein at least one side surface of a pair of side surfaces of the cam recessed portion which face the axial direction of the vibration cylinder is formed as a waveform surface.

5. The dental handpiece according to claim 3,
wherein at least one side surface of a pair of side surfaces of the cam recessed portion which face the axial direction of the vibration cylinder is formed as a gear surface having a plurality of teeth, and at least a portion of a side surface of the cam protruding portion is formed as a gear wheel surface having a plurality of teeth meshing with the gear surface.

6. The dental handpiece according to claim 1, wherein a sliding layer is formed in at least one of a surface of the cam protruding portion and a surface of the cam recessed portion.

* * * * *